(12) United States Patent
Martínez Sanz et al.

(10) Patent No.: US 8,937,026 B2
(45) Date of Patent: Jan. 20, 2015

(54) GLASS COMPOSITIONS AND METHOD FOR PRODUCING A GLASS/METAL JOIN

(75) Inventors: Noelia Martínez Sanz, Seville (ES); José Luis Oteo Mazo, Cantoblanco (ES); Jaun Rubio Alonso, Cantoblanco (ES); Fausto Rubio Alonso, Cantoblanco (ES); Alejandra Mazo Fernández, Cantoblanco (ES)

(73) Assignee: Abengoa Solar New Technologies, S.A., Sevilla (ES)

( * ) Notice: Subject to any disclaimer, the term of this patent is extended or adjusted under 35 U.S.C. 154(b) by 209 days.

(21) Appl. No.: 13/504,393

(22) PCT Filed: Aug. 12, 2010

(86) PCT No.: PCT/ES2010/000355
§ 371 (c)(1),
(2), (4) Date: Sep. 11, 2012

(87) PCT Pub. No.: WO2011/051509
PCT Pub. Date: May 5, 2011

(65) Prior Publication Data
US 2013/0005560 A1    Jan. 3, 2013

(30) Foreign Application Priority Data

Oct. 28, 2009  (ES) .................................. 200902057

(51) Int. Cl.
 *C03C 3/091* (2006.01)
 *C03C 8/24* (2006.01)
 *C03C 27/02* (2006.01)
 *C03C 27/04* (2006.01)

(52) U.S. Cl.
 CPC . *C03C 3/091* (2013.01); *C03C 8/24* (2013.01); *C03C 27/02* (2013.01); *C03C 27/044* (2013.01)
 USPC .............. 501/66; 501/14; 501/15; 501/21

(58) Field of Classification Search
 CPC ............ C03C 3/091; C03C 8/02; C03C 8/24; C03C 27/02; C03C 27/044
 USPC .......... 501/14, 15, 21, 66; 136/244, 251, 252, 136/259
 See application file for complete search history.

(56) References Cited

U.S. PATENT DOCUMENTS

| | | | |
|---|---|---|---|
| 2,877,124 A | 3/1959 | Welsch et al. | |
| 3,631,589 A | 1/1972 | Garceau | |
| 3,984,252 A * | 10/1976 | Kiefer | 428/34.4 |
| 4,386,164 A | 5/1983 | Moser | |
| 4,870,034 A | 9/1989 | Kiefer | |
| 6,635,592 B1 * | 10/2003 | Kosokabe et al. | 501/14 |
| 6,727,198 B1 * | 4/2004 | Hashimoto et al. | 501/66 |
| 6,812,175 B2 * | 11/2004 | Kawase et al. | 501/72 |
| 8,178,451 B2 * | 5/2012 | Dick et al. | 501/66 |
| 2003/0087745 A1 | 5/2003 | Peuchert et al. | |
| 2005/0061033 A1 * | 3/2005 | Petrany et al. | 65/134.9 |
| 2005/0181925 A1 | 8/2005 | Kuckelkorn et al. | |
| 2006/0189470 A1 * | 8/2006 | Mitra | 501/21 |
| 2008/0128923 A1 * | 6/2008 | Saito et al. | 257/794 |
| 2009/0141478 A1 * | 6/2009 | Niguma et al. | 362/97.1 |
| 2009/0275462 A1 * | 11/2009 | Murata | 501/66 |
| 2009/0325776 A1 * | 12/2009 | Murata | 501/66 |
| 2010/0029460 A1 * | 2/2010 | Shojiya et al. | 501/64 |
| 2010/0116169 A1 * | 5/2010 | Kaupp et al. | 106/31.9 |

FOREIGN PATENT DOCUMENTS

| | | |
|---|---|---|
| ES | 2 158 715 | 9/2001 |
| ES | 2 264 630 | 1/2007 |
| WO | WO 2008099687 A1 * | 8/2008 |
| WO | WO 2008102848 A1 * | 8/2008 |

* cited by examiner

*Primary Examiner* — Kaj K Olsen
*Assistant Examiner* — Elizabeth A Bolden
(74) *Attorney, Agent, or Firm* — Kilpatrick Townsend & Stockton LLP

(57) ABSTRACT

Novel glass compositions and method for producing a glass/metal join, in which the novel glass comprises:

| Oxide | (%) |
|---|---|
| $B_2O_3$ | 8-13.5 |
| $Al_2O_3$ | 5-9 |
| $Na_2O$ | 3-9 |
| $K_2O$ | 0-5 |
| CaO | 2-4 |
| MgO | 0-4 |
| ZnO | 0-4 |
| $SiO_2$ | Up to 100 | depending on the necessary requirements, owing to the significance thereof the thermal expansion coefficient, such that this thermal expansion coefficient is adjusted to match that of the metal part or alloy with which the glass/metal weld is to be achieved, which makes it possible to satisfactorily produce said weld which results in a strong glass/metal join, that is free from tensile stresses and that is durable over time and may be used, inter alia, to obtain parts that form part of solar collectors.

8 Claims, No Drawings

GLASS COMPOSITIONS AND METHOD FOR PRODUCING A GLASS/METAL JOIN

This application is a national phase entry of international application PCT/ES2010/000355, filed Aug. 12, 2010 and titled "Novel Glass Compositions and Method for Producing a Glass/Metal Join", which claims priority to Spanish patent application P200902057, filed Oct. 28, 2009, the entire disclosures of which are hereby incorporated by reference herein.

TECHNICAL FIELD OF THE INVENTION

Novel glass compositions, the thermal expansion coefficients of which can be selected such that they can be used as welding glasses for glass/metal joins, such as the ones that the solar collectors tubes have.

BACKGROUND OF THE INVENTION

The glass/metal joins are currently used in a wide variety of technological fields such as the electronic, electrical and medical industry, etc. These joins are especially useful for devices that have to operate under vacuum conditions, because the joins formed between the glass and the metal are quite strong and hermetical. The properties of these glass/metal joins lie in the good structural characteristics of the materials forming them, their high insulating capacity, their chemical inalterability and their impermeability to solids, liquids and gases.

These types of joins have been developed recently for solar collectors tubes parts, which requires durability over time supporting inclement weather (changes in temperature between day and night, between seasons), mechanical and thermal stresses, working temperatures of up to 400° C. and full sealing.

There are several types of glass/metal joins:
1. Joins in which the thermal expansion coefficients match: Joins where the coefficient of thermal expansion and contraction of the metal and glass are similar, such that the resulting joins have tensions within a safe limit, both during the elaboration of the join and throughout the life span of the device.
2. Joins in which the thermal expansion coefficients do not match: Joins where the coefficient of thermal expansion and contraction of the metal and glass differ considerably, so that the tensile stresses resulting from this join are ameliorated by using:
   Small diameter metals, giving rise to the so-called compression joins.
   Ductile metals that dampen part of the tensile stresses generated.
   Intermediate glasses, such that the thermal expansion coefficients adjust such that the last join between the glass and the metal will be of the first type.
3. Welding joins, in which the metal part is welded to a metal layer that has been previously deposited at the surface of the glass by any of the different existing methods.
4. Mechanical joins between the glass and the metal.

Currently the majority of the glass/metal joins are obtained by the first two methods.

The most important conditions for producing the glass/metal join are the following: that there is a good adherence between the materials to be joined, that the thermal expansion coefficients are compatible and that the softening temperature of the used glass is relatively low and that this working temperature does not affect the material to be joined.

One of the key elements of the solar power plants based on parabolic cylinder collectors (PCC) is the absorber tube and although they are currently being developed and improving the functioning of said solar power plants such that energy is generated in a more efficient and respectful with the environment manner, due to the high cost of the devices that make it up, especially the absorber tubes, the life span should be extended as much as possible (10-20 years).

The absorber tube consists of two tubes arranged in a concentric way, a glass tube arranged in the outer part and another metal tube placed in the inner part, through which a liquid circulates, usually synthetic oil, which heats up by the effect of the solar rays up to approximately 400° C. This liquid after a series of processes produces a superheated steam which is finally transformed into electrical energy.

The two tubes that form part of the absorber tube are separated by a vacuum chamber and, in turn, they are joined through a glass/metal join. Due to the large dimensions and weight of the absorber tube (approximately 4 meters in length and 100 mm diameter), together with the vitreous nature of the outer tube and since these devices are placed in the open air and they are subject to experience the inclement weather (hail, rain and erosion from particles of dust, etc.) make the glass/metal join one of the most important and weak parts of the parabolic cylinder collector. Moreover the sealing between the two tubes must be hermetical and the vacuum kept such that the heat loss is minimized and the power generation is optimized.

The first attempts to obtain this type of glass/metal joins present in the solar collectors were made with an approximation of the HouseKeeper method where a thin layer of copper and a glass, the thermal expansion coefficients of which differed considerably, was used. The metal was thinned to facilitate the formation of the glass/metal join and subsequently the glass was heated such that the metal could be introduced inside. Due to the small thickness of the metal and to the ductile nature of copper the tensile stresses generated due to the differences between the thermal expansion coefficients were minimized and a satisfactory glass/metal join was obtained.

Due to the nature and the thickness of the used metal, this was able to withstand the tensile stresses generated during the cooling of the piece as well as during the life span of the device. However, this type of glass/metal welding did not completely meet the requirements of these systems since they were the weakest part of said system and therefore one of the parts to be improved.

Subsequently a new step forward for this kind of systems was introduced, such as the one consisting of using a metal and a glass, the thermal expansion coefficients of which are very similar such that the join is stronger than the one achieved through the HouseKeeper method and therefore the duration of the system will also be greater.

Currently at the commercial level a glass and a metal alloy are used the thermal expansion coefficients of which are around $5 \times 10^{-6}$ °C.$^{-1}$.

The glasses have many qualities that make them appropriate in the vacuum industry and these advantages are, among others:
  They are virtually impermeable to gases.
  According to their chemical composition they can selectively transmit at several wavelengths.
  They have good electrical insulation properties.
  They are easily molded over a flame.

By choosing a particular chemical composition the properties of the glass can be varied such that glasses with properties that match those of the desired metal can be obtained.

It is in this line that the invention proposed in the following is developed.

DESCRIPTION OF THE INVENTION

It is an object of the present invention to describe a new family of glass compositions that can be used to obtain glass/metal joins. The characteristics of the glass will be designed such that glasses having properties such as coefficient of thermal expansion and chemical resistance can be obtained, which allows to obtain glass/metal joins where the thermal expansion coefficients of both parts are as closest as possible.

There have been attempts for changing the existing solutions, expanding the selection of the metals or metal alloys known on which the weld can be carried out, but metals or alloys that allow carrying out said weld in better conditions have not been found since the thermal expansion coefficients differ greatly. On the other hand, another type of glass with a greater coefficient of thermal expansion could be used but generally the increase of the coefficient of thermal expansion in the glass is associated with a detriment of the properties at least of chemical resistance.

The glass used for joins with other materials are classified generally as "hard" and "soft" glasses depending on the coefficient of thermal expansion $\alpha$. The hard glasses have low thermal expansion coefficients, $\alpha<5\times10^{-6\circ}$ C.$^{-1}$, while soft glasses have higher thermal expansion coefficients, $\alpha>8\times10^{-6\circ}$ C.$^{-1}$. In general, glasses with high thermal expansion coefficients have lower working and softening temperatures, but normally this entails a detriment of the chemical properties of said glass. It is therefore also an object of the present invention that the designed glasses have a coefficient of thermal expansion $\alpha\sim5\times10^{-6\circ}$ C.$^{-1}$ and this always is $<8\times10^{-6\circ}$ C.$^{-1}$.

It is also an object of the present invention, designing new glasses the thermal expansion coefficients of which adjust as much as possible to the metal alloy or metal part, in a manner that is unnecessary the use of intermediate glasses that make the process more expensive and limit its industrialization. In addition, these intermediate glasses usually present a limited chemical resistance, thereby limiting the durability of the devices obtained with the passage of time and also limiting it for its use under certain mechanical stresses or working conditions.

As a metal part or alloy to be joined to the designed glass an iron-based alloy is selected. This alloy has nickel and cobalt in addition to iron, which make this alloy ideal for being used in glass/metal joins with glasses having thermal expansion coefficients as those described in this patent.

This type of alloys were developed primarily to be joined with hard glasses due to the problems of working with molybdenum and tungsten which were the metals traditionally used because the thermal expansion coefficients were the closest for this type of glasses.

In the present day these alloys are widely used for the manufacture of glass/metal joins to obtain strong joins where vacuum or high vacuum conditions are required as e.g. in the manufacture of X-ray tubes.

Within these alloys the one known as Nile-K is selected (or with many other names such as Kovar, Nicoseal, Nicosel, Rodar, Telcoseal, Sealvar, Dilver, Pernifer 29-18, Alloy 29-17, ASTM F 15, DIN 17745, AFNOR NF A54-301 and SEW 385) which is a ternary alloy that has 29% nickel, 17% cobalt, <0.2% silicon, <0.3% manganese, <0.2% carbon and the rest iron. This alloy has a coefficient of thermal expansion $\alpha\sim5\times10^{-6\circ}$ C.$^{-1}$.

This invention proposes a new glass family compositions, the thermal expansion coefficients of which can be designed such that they are close to that of the metal part or alloy with which it is desired to join them. The coefficient of thermal expansion is designed depending on the composition of oxides that form part of said glass.

The majority of the metals or alloys employed in the joins with glass have thermal expansion curves quite different from those characteristic of the glasses. To obtain a safe weld and free of tensile stresses the thermal expansion coefficients between the glass and the metal must match only in the region of temperature lower than the area of glass transformation, in fact, usually for higher temperatures, the thermal expansion of both parts always differ.

The present invention includes a glass family fundamentally and mainly formed by the following oxides ratio: $SiO_2$, $B_2O_3$, $Al_2O_3$, $Na_2O$, $K_2O$, CaO, MgO, ZnO and to a lesser extent, <1%, by other oxides which may be present in the raw materials as impurities ($TiO_2$, $Fe_2O_3$, $Cr_2O_3$, etc.) or another type of compounds that can be used as chemical refining elements during the process of making the glass.

The glass family of the present invention is formed by proportions, expressed in oxides as those shown below:

| Oxide | (%) |
|---|---|
| $B_2O_3$ | 8-13.5 |
| $Al_2O_3$ | 5-9 |
| $Na_2O$ | 3-9 |
| $K_2O$ | 0-5 |
| CaO | 2-4 |
| MgO | 0-4 |
| ZnO | 0-4 |
| $SiO_2$ | Up to 100 |

The present invention also includes novel glass compositions that can be employed in the development of glass/metal joins present e.g. in tubes for solar collectors. Said compositions have thermal expansion coefficients comprised between 3 and $8\times10^{-6\circ}$ C.$^{-1}$.

The amount of CaO has been increased with respect to other glass families described above and this has lowered the working temperature of the glass and therefore it has reduced the costs during the manufacture of the glass. In addition, although the temperature of the glass manufacture has been reduced this result has not caused the detriment of the chemical properties of the glass so obtained.

DESCRIPTION OF A PREFERRED EMBODIMENT

To achieve a better understanding of the invention, how one of the preferred compositions would be as well as the method for carrying out the join are going to be described next, also according to a preferred embodiment.

The preferred composition of this glass family consists of: 74.2% $SiO_2$, 8.56% $B_2O_3$, 5.72% $Al_2O_3$, 5.63% $Na_2O$, 2.13% $K_2O$, and 3.57% CaO. The preferred composition has a coefficient of thermal expansion of $5.3\times10^{-6\circ}$ C.$^{-1}$, this property could be adjusted by means of a prior theoretical calculation of the compositions in oxides present in the glass. The hydrolytic resistance, hydrolytic resistance meaning that offered by the glass to the release of water soluble minerals, at 98° C. of this glass has been evaluated using the ISO 719, proving to be HGB 1. The hydrolytic resistance has also been evaluated at 121° C. according to ISO 720 proving to be HGA 1.

With regard to the method of realization of the join, this implies a series of stages that must be carried out continuously without downtime intervals among them. The stages are the following: a) Preparation of metal, b) metal-glass welding and c) elimination of tensile stresses.

The following describes each stage of the process.

a) Preparation of Metal:

First of all the cleaning and degreasing of said metal should be carried out.

Subsequently, a surface oxidation of said metal part must be carried out to promote a better adherence with the glass in the glass/metal join. This oxidation must be carried out between 850 and 900° C. under air atmosphere, until it can be seen that the metal part has a reddish coloration.

b) Metal-glass Welding:

After the oxidation of the metal, the heating of the glass part to be joined to the metal is carried out until a temperature above its softening temperature is reached.

Once the softening temperature is reached the two parts are approached such that the glass and the metal are attached forming a glass/metal join with appropriate properties and sufficient for the purpose pursued.

c) Elimination of Tensile Stresses:

Once the glass/metal join has been carried out a heat treatment will be carried out that will remove the tensile stresses present both in the glass and in the glass/metal join.

When the heat treatment is finished it will be noted that the metal has a grayish color, being unwanted a black coloration in the metal that could be indicating an over-oxidation of the same. If this over-oxidation had occurred it could lead to a less adherence between the glass and the metal, which would reduce both the strength and the durability of the join and therefore of the device.

The invention claimed is:

1. A glass composition for forming glass/metal joins, the glass composition consisting essentially of:

| Oxide | (weight %) |
|---|---|
| $B_2O_3$ | 8-13.5 |
| $Al_2O_3$ | 5-9 |
| $Na_2O$ | 3-9 |
| $K_2O$ | 0-5 |
| CaO | 3.57-4 |
| MgO | 0-4 |
| ZnO | 0-4 |
| $SiO_2$ | 74.2-80.43 | wherein the weight percentages of the components of the composition are selected such that the thermal expansion coefficient of the resulting composition is greater than $4 \times 10^{-6}$ °C.$^{-1}$ and is less than $6 \times 10^{-6}$ °C.$^{-1}$.

2. The glass composition for forming glass/metal joins according to claim 1 wherein the component weight percentages include 74.2% $SiO_2$, 8.56% $B_2O_3$, 5.72% $Al_2O_3$, 5.63% $Na_2O$, 2.13% $K_2O$, 3.57% CaO.

3. The glass composition for forming glass/metal joins according to claim 1, wherein the weight percentages of the components of the composition are selected such that the thermal expansion coefficient of the resulting composition is at least $4.5 \times 10^{-6}$ °C.$^{-1}$ and is less than $5.5 \times 10^{-6}$ °C.$^{-1}$.

4. The glass composition for forming glass/metal joins according to claim 1, wherein the weight percentages of the components of the composition are selected such that the thermal expansion coefficient of the resulting composition is at least $5.0 \times 10^{-6}$ °C.$^{-1}$ and is less than $5.5 \times 10^{-6}$ °C.$^{-1}$.

5. The glass composition for forming glass/metal joins according to claim 1, wherein the weight percentages of the components of the composition are selected such that the thermal expansion coefficient of the resulting composition is about $5.0 \times 10^{-6}$ °C.$^{-1}$.

6. The glass composition for forming glass/metal joins according to claim 1, wherein the weight percentages of the components of the composition are selected such that the thermal expansion coefficient of the resulting composition is about $5.3 \times 10^{-6}$ °C.$^{-1}$.

7. The glass composition for forming glass/metal joins according to claim 1, wherein the weight percentages of the components of the composition are selected such that the composition has a thermal expansion coefficient suitable for using the glass composition in a glass/metal join with a metal alloy having 29 weight percent nickel, 17 weight percent cobalt, less than 0.2 weight percent silicon, less than 0.3 weight percent manganese, less than 0.2 weight percent carbon, and the rest iron.

8. The glass composition for forming glass/metal joins according to claim 1, wherein the weight percentages of the components of the composition are selected such that the composition has a thermal expansion coefficient suitable for using the glass composition in a glass/metal join with a metal having a thermal expansion coefficient of about $5.0 \times 10^{-6}$ °C.$^{-1}$.

* * * * *